United States Patent [19]
Jennemann

[11] Patent Number: 5,836,815
[45] Date of Patent: Nov. 17, 1998

[54] METHOD AND SYSTEM FOR RADON MITIGATION

[76] Inventor: Paul V. Jennemann, 3220 Corporate Ct.-Ste. E, Ellicott City, Md. 21042

[21] Appl. No.: 884,652

[22] Filed: Jun. 27, 1997

[51] Int. Cl.$^6$ ........................................................ F24F 7/06
[52] U.S. Cl. ........................... 454/341; 52/169.5; 454/909
[58] Field of Search ........................... 52/169.5; 454/341, 454/345, 909

[56] References Cited

U.S. PATENT DOCUMENTS

| | | | |
|---|---|---|---|
| 4,949,626 | 8/1990 | Townsend et al. | 454/909 X |
| 5,249,398 | 10/1993 | Spanberg | 52/169.5 |
| 5,551,797 | 9/1996 | Sanford | 454/909 X |

*Primary Examiner*—Harold Joyce
*Attorney, Agent, or Firm*—Rosenberg, Klein & Bilker

[57] ABSTRACT

A radon mitigation method and system for mitigating the migration of radon into a building structure which includes an in-ground collection basin (200) formed in the foundation of the building structure. A liner (300) is located within the basin (200) with the liner (300) having both a sub-basin portion (320) and a rim portion (310). The rim portion (310) of the liner (300) forms a plenum chamber (400) between the liner (300) and the basin (200). The liner rim portion (310) is sealed to the basin (200) by a seal (410). A conduit (417) leads out of the building structure to remove gas from the plenum chamber (400). A pump (13) is operatively connected to the conduit (417) to exhaust gas through the conduit (17) to remove any radon within the plenum chamber (400) to the outside of the building structure.

20 Claims, 5 Drawing Sheets

METHOD AND SYSTEM FOR RADON MITIGATION

BACKGROUND OF THE INVENTION

FIELD OF THE INVENTION

The subject method and system for mitigating radon is generally directed to a system for preventing the entry of radon into the air of the confined area within a building structure. More specifically, the subject radon mitigation system is adapted to mitigate the migration of radon into the building structure through cracks, crevices and openings in the structure foundation and/or slab by depressurizing the soil beneath the structure.

In many building structures, particularly residential structures, a ground water collection basin is installed beneath the foundation slab of the lowest level of the structure. The purpose for this collection basin is to collect liquid, particularly ground seepage water, that could otherwise remain beneath the structure foundation slab. This collection basin also serves to collect flood water due to broken water pipes, discharge from high pressure relief valves of water heaters, or heavy rain. During the building's construction stage, various drainage conduits for directing the flow of water from in-ground and above-ground sources are put in place to discharge into this collection basin. A sump pump assembly with an automatic sensing switch is then installed in the collection basin to discharge the accumulated water to the exterior of the building structure.

A typical configuration of such a drainage system, as installed in the lower level of a residential building structure, is illustrated in FIG. 1. As there shown, a concrete slab 1 which forms the basement floor extends laterally between foundation walls 2a, 2b. Slab 1 is supported immediately underneath by an aggregate layer 3, typically formed by four inches of gravel or other stony material which is spread over the underlying ground soil and covered with a plastic moisture barrier 3'. Within the aggregate layer 3, one or more perforated drain tiles 4 are installed to serve as drainage conduits for ground water that has seeped into the aggregate layer 3. Other drainage conduits leading from above-ground sources such as drain line 5 for directing the flow of water from the air conditioning/furnace condensate line unit 6 and the discharge water of the high pressure relief valve of the hot water heater 7, and a drainage conduit 8 leading from a stairwell drain 9 are also installed.

The collection basin 10 typically employed in the prior art extends through the slab 1 and well below the aggregate layer 3 such that it receives, through openings in its side walls, the discharge from the longitudinal openings of drain tiles 4 and above-ground drainage conduits 5, 8. Collection basin 10 often includes a shoulder portion 11 formed sufficiently near its upper edge to extend radially into the slab 1 so as to serve as a support ledge structure for a collection basin cover 12.

A sump pump assembly 13 is placed within collection basin 10 to pump the liquid discharged into collection basin 10 by drain tiles 4 and conduits 5, 8 out and away from the building through a sump pump exhaust conduit 16. Sump pump assembly 13 is either of the pedestal type shown here, with a driving motor 14 that must be suspended well above the surface of the liquid being pumped, or of the submersible type (such as shown in FIG. 2) with a driving motor 14 that is submersible below the liquid level.

In operation, liquid drained through perforated tiles 4 and conduits 5, 8 freely discharges into collection basin 10. When the liquid collected within collection basin 10 rises to a predetermined level, sump pump motor 14 is automatically activated, and the liquid is pumped by the assembly 13 through sump pump exhaust conduit 16 to be expelled outside the building structure. A sump pump check valve 15 is normally provided at a selected point on conduit 16 to prevent the backflow of liquid once pumping is stopped. As described in following paragraphs, this check valve 15 also serves to prevent the flow of air into the collection basin when, in accordance with the present invention, it is used as a plenum chamber for mitigation of radon gas.

The in-ground drainage system of FIG. 1 has proven to operate quite effectively in draining out of and away from the given building structure any liquid that might otherwise accumulate and flood the building structure's basement floor. The drainage system, however, also serves as a conduit for the flow of ground gases occurring from the underlaying soil, and which subsequently are drawn into the building structure. One such gas is radon, a heavy radioactive element formed by the disintegration of radium, readily recognized to be both harmful to human beings and geographically prevalent. Radon enters a building structure through unsealed cracks and crevices at joints in the building's foundation as indicated by the directional arrows 50, 50', and as shown in FIG. 1. The prior art drainage system discussed above also provides for virtually unimpeded paths for the flow of radon into the air space of the given building structure through the perforated tile drains 4, collection basin 10 and around the basin cover 12.

Absent special modifications, basin cover 12 is invariably a disk-like member which simply rests on shoulder portion 11 of collection basin 10. Typically, cover 12 is formed with one or more sizable slots which enable the cover 12 to be removed and replaced without disassembly or removal of any portion of either the sump pump assembly 13 or sump pump exhaust conduit 16 that pass into collection basin 10. As cover 12 is intended merely to provide a crude obstruction to prevent the entry of debris into collection basin 10, no measures are typically taken either to seal the engagement of cover 12 with collection basin 10, nor to fill in the extra space in the slotted opening(s) surrounding the portions of the sump pump assembly 13 and sump pump exhaust conduit 16 passing through the cover. Consequently, generous access remains for migration of radon from collection basin 10 into the building structure's air space, as indicated by directional arrows 51, 51', 51".

In a functional building structure, various factors such as the evacuating effects due to the operation of exhaust fans, variations in atmospheric pressure, the occurrence of combustion processes, the formation of temperature gradients, and the stack effect deriving from the existence of air conduits exposed to air external to the building, tend to cumulatively generate a negative pressure differential between the air space immediately above the building's slab 3 and the ground therebeneath. This negative pressure differential essentially causes the suction of radon from the ground into the building's internal air space along the paths indicated by arrows 50, 50', 51, 51', 51". Once drawn into the building's internal air in such manner, radon is readily circulated throughout the entire building structure by the building's own climate control systems, if it does not simply migrate with the natural flow of air throughout the building.

Given that a drainage system of the type described above is found in so many building structures, the need for a simple and effective radon mitigation system is evident. The need becomes even more evident when one considers that radon is found in harmful concentrations in many of the most heavily populated regions of the United States.

PRIOR ART

Radon mitigation measures designed specifically to address the vulnerability resulting from the use of sump pump liquid drainage systems are known in the art. A basic technique widely practiced in the art is simply to seal all discernible cracks and other openings in the building's foundation structure. This technique alone, however, has been found to be insufficient in significantly reducing radon levels observed in given building structures.

A more effective radon mitigation technique practiced in the art, known as sub-slab depressurization, is shown in FIG. 2. This technique essentially seeks not only to adequately seal all cracks and other openings in the building's foundation slab, it seeks also to depressurize the space within the drainage system by applying suction to the collection basin 10 such that the radon gas that might otherwise migrate into the given building's living spaces may be drawn into the collection basin for subsequent expulsion therefrom into the atmosphere outside the building. To that end, the technique requires that air-tight seals be formed at points such as those noted by arrows 150, 151, 152, 153. A collection basin cover 112 specially designed to overlap and closely conform to the shoulder portion 11 of collection basin 10 is tightly installed, in sealed manner, in place of the simple basin cover 12 shown in FIG. 1. The pedestal-type sump pump assembly 13 must be replaced here with a submersible-type sump pump assembly 113 having its driving motor 114 located within collection basin 10. Drain conduits 105, 108 leading into collection basin 10 from above-ground sources are effectively sealed off in air-tight manner at their respective discharge ends by the coupling of water traps 105', 108', which are configured to insure that an amount of water remains trapped therein at all times to prevent the passage of air.

As in the system of FIG. 1, a sump pump exhaust conduit 116 is passed through an opening in the collection basin cover 112; however, means are taken to insure that no extraneous air passages remain between conduit 116 and cover 112. A gas exhaust conduit 117 is additionally passed through cover 112 in similarly sealed manner such that the air within collection basin 10 may be evacuated therethrough by the action of a fan-driven pump 118. Radon mingling with the air inside collection basin 10 is thus pumped out to the air outside of the building structure, as indicated by the directional arrow 154.

This sub-slab depressurization technique is the prevalent radon mitigation technique currently practiced in the art when performing mitigation on homes that have sump holes and drainage systems installed. A few notable disadvantages are inherent in this technique. First, a custom fitted, precisely-crafted collection basin cover 112 is an absolute necessity here, as it serves as the critical seal for collection basin 10. This requires not only that cover 112 be affixed to the collection basin 10 to effect an adequate seal, it requires that any structure passing through cover 112 be passed in a sealed manner. This, in turn, requires that the passing structure not be movable, lest the seal between that structure and the cover be broken. This, therefore, makes it mandatory that any existing pedestal type sump pump assembly 13 (FIG. 1) be replaced by a submersible type sump pump assembly 113, as the mechanical linkage between the suspended motor of a pedestal type sump pump assembly 13 and the submersible portions of that assembly located within the given collection basin must at some point pass through the collection basin cover.

Other inherent disadvantages of the prior art are brought to light by Radon Mitigation Standards established by the United States Environmental Protection Agency. These standards require that a working floor drain be installed when sealing the collection basin 10 and recommend that a view port be installed. The formation of an adequate floor drain and view port (typically installed in the cover 112 of the collection basin 10) which does not compromise the strength, durability, or the airtight seal, further adds to the complexity and cost of the collection basin cover 112.

Due in large part to the complicated nature of the steps required to install a sub-slab depressurization radon mitigation system, especially when the home has a sump pump to contend with, the technique becomes rather time consuming and expensive. Consequently, many potential beneficiaries of radon mitigation systems continue to endure the harmful effects of radon. A radon mitigation technique that is simpler, less time-consuming, and less expensive to employ than currently known radon mitigation techniques is urgently needed.

SUMMARY OF THE INVENTION

The primary object of this invention is to provide a system for mitigating the migration of radon and other in-ground gases into a building structure having an in-ground drainage system with collection basin formed in its foundation.

It is another object of this invention to provide a substantially sealed plenum chamber within a structure's in-ground drainage system from which in-ground gases and liquids may be discharged.

It is another object of the present invention to provide a plenum chamber within a structure's drainage system that may be isolated from a sump-pump assembly operating within the collection basin.

It is another object of the present invention to provide a plenum chamber within a building structure's drainage system which is isolated from drainage conduits leading from above ground sources, such as floor drains and condensate discharge lines.

It is another object of the present invention to provide a collection basin liner which will facilitate simple and economical realization of a sealed plenum chamber within the building structure's collection basin.

It is yet another object of the present invention to provide a collection basin liner member which may be installed in retrofit manner to a building structure's existing drainage system collection basin.

It is yet another object of the present invention to provide a drainage system collection basin and collection basin liner member combination which reliably isolates the drainage field and collection basin from the sump pump assembly.

These and other objects are attained in the radon mitigation system of the present invention. The subject radon mitigation system generally includes a liner member formed substantially of a gas impermeable material disposed within an in-ground collection basin, wherein the liner member is formed by a longitudinally extending sub-basin portion of a predetermined dimensional configuration and a rim portion extending substantially radially outward therefrom. The rim portion contiguously engages the basin to define a plenum chamber between the liner member and the basin. The subject radon mitigation system also includes measures for effecting an airtight seal at the engagement of the liner member's rim portion and the basin. The system also includes a gas exhaust conduit coupled to the liner member and leading out of the given building structure for the expulsion therethrough of gas from the plenum chamber;

and, a mechanism operably coupled to the gas exhaust conduit for generating an exhaust air flow through the gas exhaust conduit from the plenum chamber, whereby radon entering the plenum chamber is expelled out of the building structure. The radon mitigation system preferably includes a valve mechanism coupled to the liner member which enables irreversible passage of liquid from the plenum chamber into the liner member's sub-basin portion without permitting the passage of air therethrough in substantial amounts.

In one embodiment of the subject radon mitigation system, a specially-configured basin member is installed during construction of the given building structure in place of the basin typically employed in prior art sump pump drainage systems. The basin in accordance with that embodiment, includes an upper portion connected to a lower portion by a shoulder portion with which the liner member's rim portion engages. The basin member's upper portion extends downward a sufficient extent such that the building structure's drainage conduits leading from above-ground sources may be coupled to the basin at that upper portion. The openings of such conduits are then outside the plenum chamber formed between the liner member and the basin member's lower portion.

DETAILED DESCRIPTION OF THE PREFERRED EMBODIMENTS

Figure 2:
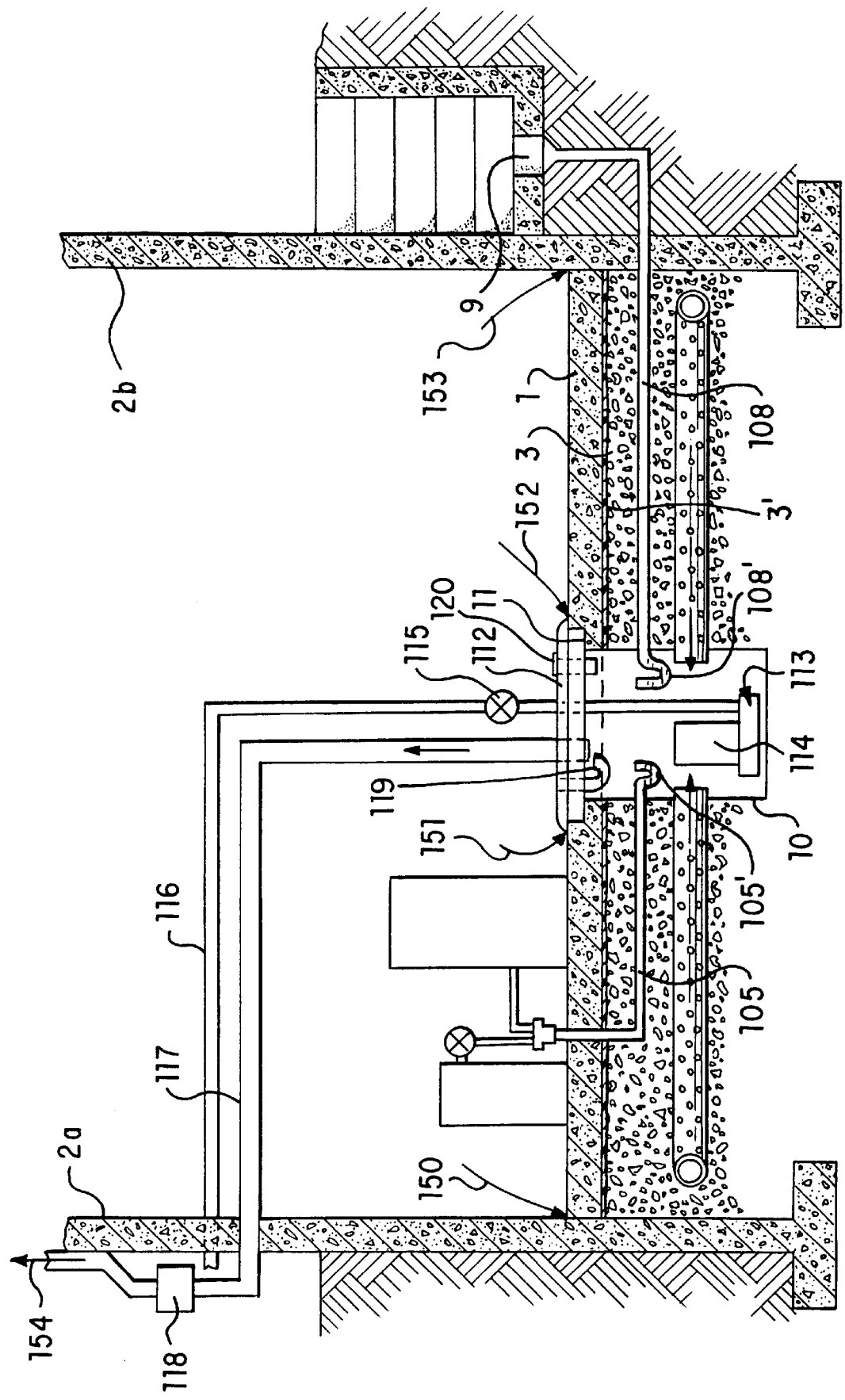
FIG. 2 is a cross-sectional schematic diagram of a prior art radon mitigation system retrofitted onto an existing sump pump drainage system of a building structure.
Figure 3A:
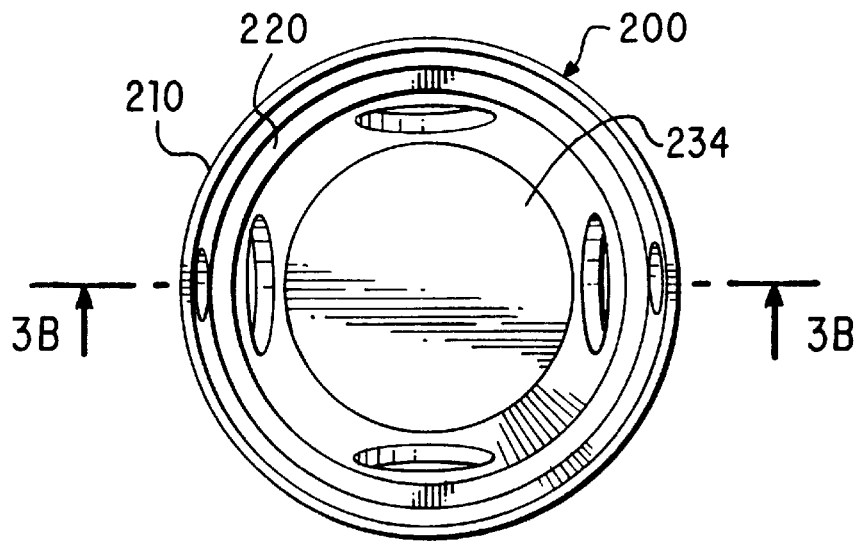
FIG. 3A is a plan view of a basin member according to one embodiment of the present invention.
Figure 3B:
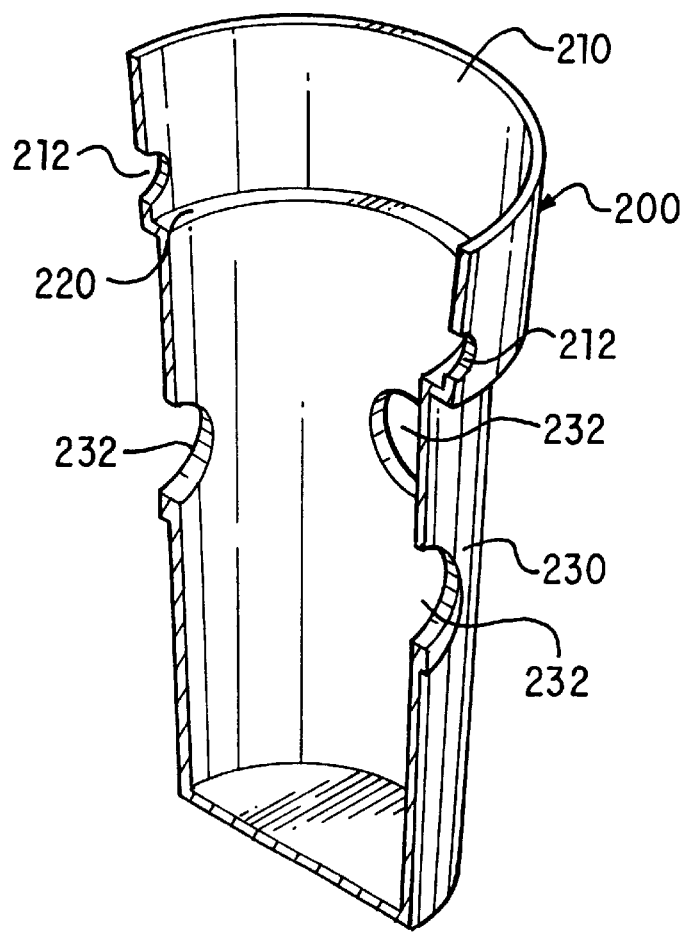
FIG. 3B is a perspective view, partially cut-away, of the basin member of FIG. 3A.

Referring now to FIGS. 3A, 3B, there is shown an embodiment of a collection basin of the subject radon mitigation system. The subject radon mitigation system may be implemented either as a retrofit system installed within a building structure's existing sump pump drainage system, or built-in as part of the original sump pump drainage system installed during the building structure's construction. Where the radon mitigation system is built-in during the building structure's original construction, it is preferable that a basin 200 configured as shown in FIGS. 3A, 3B be installed in place of the collection basin typically installed in prior art sump pump drainage systems (such as collection basins 10, 10 in FIGS. 1,2).

A sump pump collection basin generally serves to collect liquid seeping through the ground beneath the given building structure as well as liquid drained from above-ground sources for periodic expulsion by an electric sump pump assembly residing therein. A collection basin is, therefore, formed essentially as a substantially water-impermeable lining structure for a pit extending into the ground immediately beneath the building. It is typically formed of such materials as concrete, metal, and injection-molded or thermoformed plastics; and is configured with a shoulder portion 11 (FIGS. 1, 2) which flares radially outward to form a ledge structure on which a drainage cover 12, 112 (FIGS. 1, 2) rests when installed. In prior art sump pump drainage systems, drainage conduits for draining liquid directly from both above-ground and underground sources discharge into the collection basin 10, 110 by extending through its sidewall at points below the basin's shoulder portion 11 which is positioned to engage a portion of the building's foundation slab 1.

Basin 200, in accordance with one embodiment of the present invention, is formed with a shoulder portion 220 connecting an upper portion 210 and a lower portion 230. Upper portion 210 extends downward by a sufficient dimension that when basin 200 is installed, this upper portion 210 extends into the ground beneath the building structure well beyond its foundational slab 1. Consequently, the conduits 5, 8 (FIGS. 1, 2) leading from above-ground sources may readily be made to discharge into basin crock 200 through openings 212, 212 formed in its upper portion 210. The basin's shoulder portion 220 will then be positioned on the basin 200 at a point below those openings 212, 212— openings through which direct access to above-ground air via conduits 5, 8 results. Openings 232, 232 are formed through the lower portion 230 of basin 200 to accommodate the perforated in-ground drainage conduits that terminate into that basin 200. Preferably, the openings 212, 232 are outlined during manufacture, the resulting 'cutout' or 'stamp-out' portions being removed as necessary during installation for the given application.

Figure 4A:
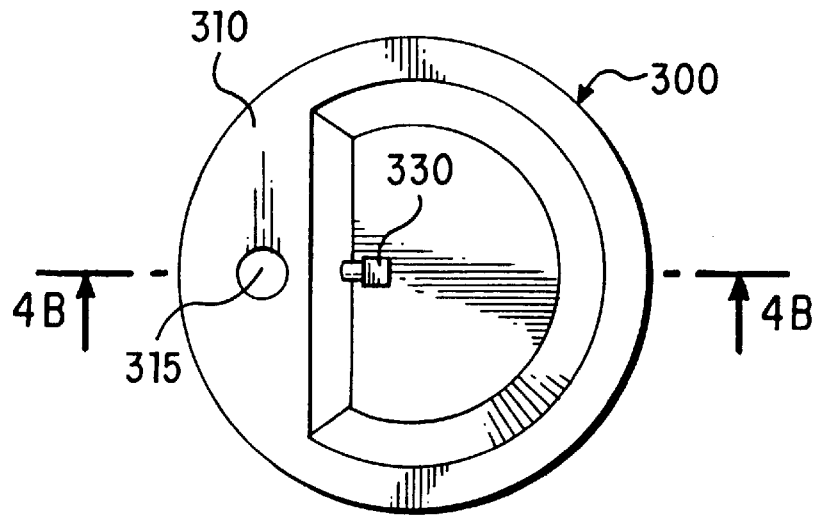
FIG. 4A is a plan view of a liner member and valve mechanism coupled thereto according to an embodiment of the present invention.
Figure 4B:
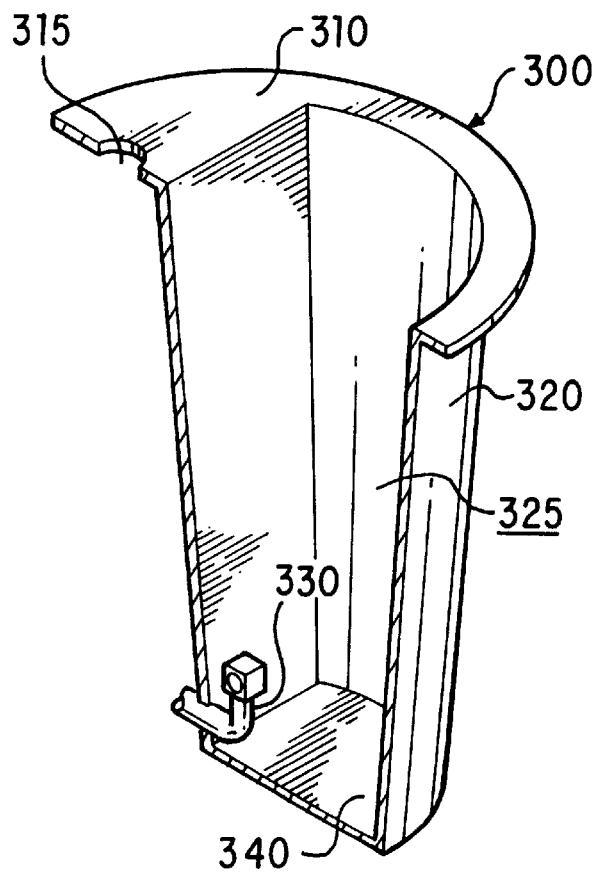
FIG. 4B is a perspective view, partially cut-away, of the liner member and valve mechanism shown in FIG. 4A.

Turning now to FIGS. 4A, 4B, there is shown an embodiment of a liner member 300 of the present invention. Liner member 300 is preferably an integrally-molded structure formed with a sub-basin portion 325 defined by sidewall portion 320, rim portion 310, and a bottom floor portion 340. The sidewall portion 320 extends downward from the radially extending rim portion 310.

In use, liner member 300 is placed within basin 200, if one has been installed during the construction phase of the structure, or otherwise installed in retrofit manner within the existing basin 10. In either case, liner member 300 is placed within the given basin 200, 10 such that its rim portion 310 makes contiguous contact with the basin's shoulder portion 220, 11.

Liner member 300 serves to seal off the space substantially bounded by the given basin 200, 10, liner sidewall portion 320, and liner rim portion 310. As such, it is important that liner member 300 be formed of an air-impermeable material, preferably of sufficient strength and durability to withstand many years of exposure to liquid collected within the basin 200, 10 and to withstand operation of a sump pump assembly received within its sub-basin portion 325. Preferably, the material composition of liner member 300 is characterized by sufficient flexibility such that it may deform, if necessary, conforming to existing irregularities within the drainage basin 10, when employed in a retrofit application to an existing sump pump drainage system (see FIG. 6).

An evacuation opening 315 may be formed through a designated area of the rim portion 310 so as to allow the passage therethrough of an exhaust conduit described in following paragraphs through which evacuation of the sealed-off space within the given basin 200, 10 may be effected, if necessary. A sump pump assembly (not shown) of either the pedestal or submersible type would normally be placed directly on the bottom floor portion 340 of the liner 300.

In order to preserve the airtight seal effected by liner member 300, a check valve 330 is preferably installed through the sidewall portion 320 of liner member 300. Check valve 330 functions to automatically allow the flow of liquid from the basin 200, 10 to the basin liner's sub-basin portion 325 for subsequent exhaustion via the sump pump assembly's operation. Check valve 330 may be replaced by any other suitable valve mechanism operable to permit the flow of liquid without permitting the concurrent passage of air into the sealed space betwen liner 300 and basin 200, 10.

Figure 5:
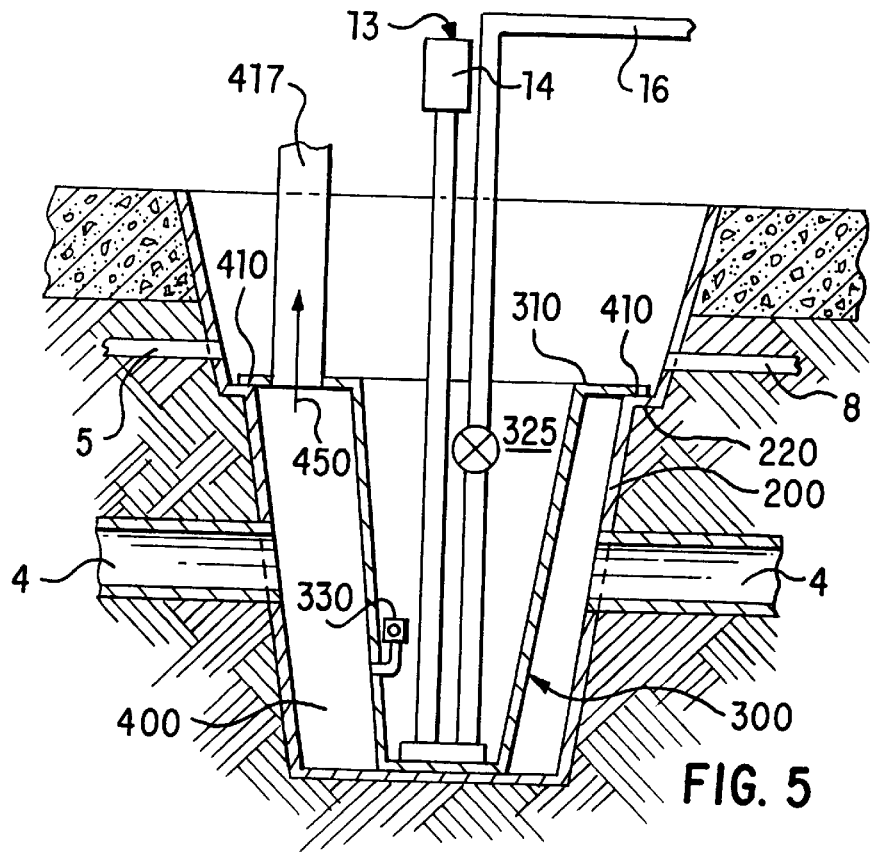
FIG. 5 is a cross-sectional schematic view of one embodiment of the present invention; and, FIG. 6 is a cross-sectional schematic diagram of an alternate, retrofit embodiment of the present invention.

Turning now to FIG. 5, there is shown an application of one embodiment of the present invention wherein a basin 200 having the configuration shown in FIG. 3 has been installed during the construction of a building structure. Linear 300 is seated within basin 200 with the liner member rim portion 310 contiguously engaging the shoulder portion 220 of the basin 200. An air tight seal 410 is achieved between the liner rim portion 310 and the basin shoulder 220 by use of a suitable adhesive or other suitable sealing techniques known in the art. Once properly seated and sealed onto basin 200, liner 300 seals off a plenum chamber 400 between the inner surfaces of basin 200 and itself.

In the event that subsequent environmental testing detected the presence of radon in significant amounts, an exhaust conduit 417 may be fitted through the evacuation opening 315 of the liner member's rim portion 310 to extend into the plenum chamber 400 and routed to the exterior of the structure where it is connected to a suitable pumping or exhaust fan mechanism. The pumping or exhaust fan mechanism serves to depressurize the plenum chamber 400 and the underlying soil 3 via the perforated drain tile 4 and evacuates the accumulated gas as indicated by the directional arrow 450, thereby expelling radon from the given building structure. As the ground gas is sucked through the perforated tile and discharged through the exhaust conduit 417, the accumulated ground seepage water is passed through check valve 330 into the sub-basin portion 325 of liner 300 for expulsion by sump pump assembly 13 through sump pump exhaust conduit 16.

With this system configuration, the plenum chamber 400 is effectively sealed and isolated from ambient atmospheric pressure, as open access of the plenum chamber 400 to ambient above-ground air through conduits 5, 8 is avoided. In this configuration the sump pump assembly is maintained at ambient pressure which eliminates the need to replace pedestal sump pumps 13 and to install a floor drain 119 and view port 120 (FIG. 2).

Figure 1:
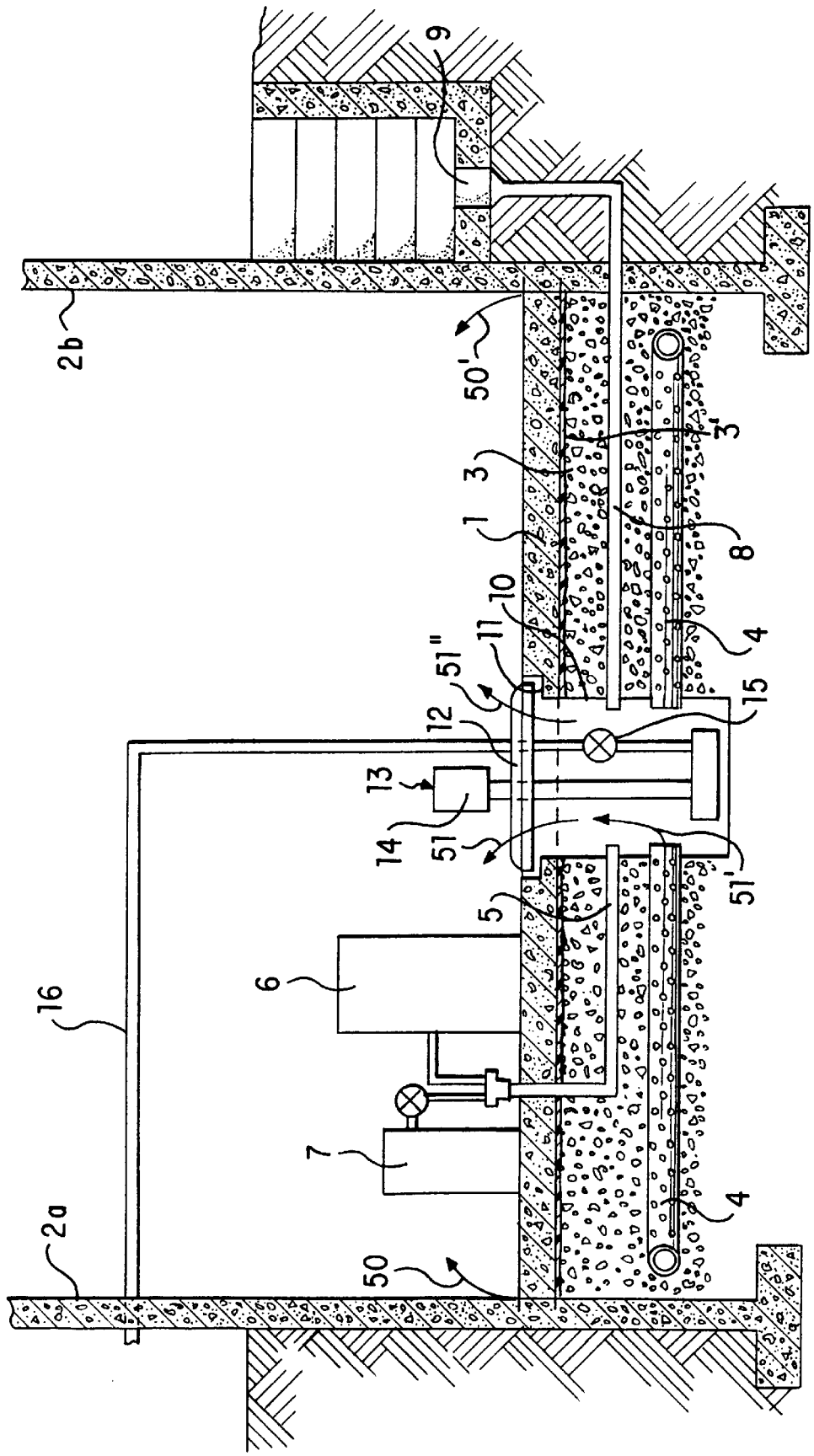
FIG. 1 is a cross-sectional schematic diagram of a prior art sump pump drainage system of a building structure.

Also, with the system configuration of FIG. 5, open exposure to above-ground air—through conduits 5, 8—which would otherwise compromise any attempt to evacuate a space within basin 200 is completely eliminated, for conduits 5, 8 are made to discharge into that portion of basin 200 outside the sealed plenum chamber 400. Hence, not only are above-ground drain conduits 5, 8 precluded from compromising the evacuation of plenum chamber 400, the potential for undesired and unintended removal of the conditioned air within the living spaces of the building structure is virtually eliminated. That is, had condensate conduit 5 which, as shown in FIGS. 1, 2, terminated into the plenum chamber 400, conditioned air from internal ambient air space would be exhausted along with exhaust gas flow 450 through exhaust conduit 417. This would undermine the building structure's heating/cooling energy efficiency and potentially reduce the air pressure in the building structure, giving rise to potential back drafting of combustion burning sources and subsequent accumulation of carbon monoxide gas in the structure's living space.

Figure 6:
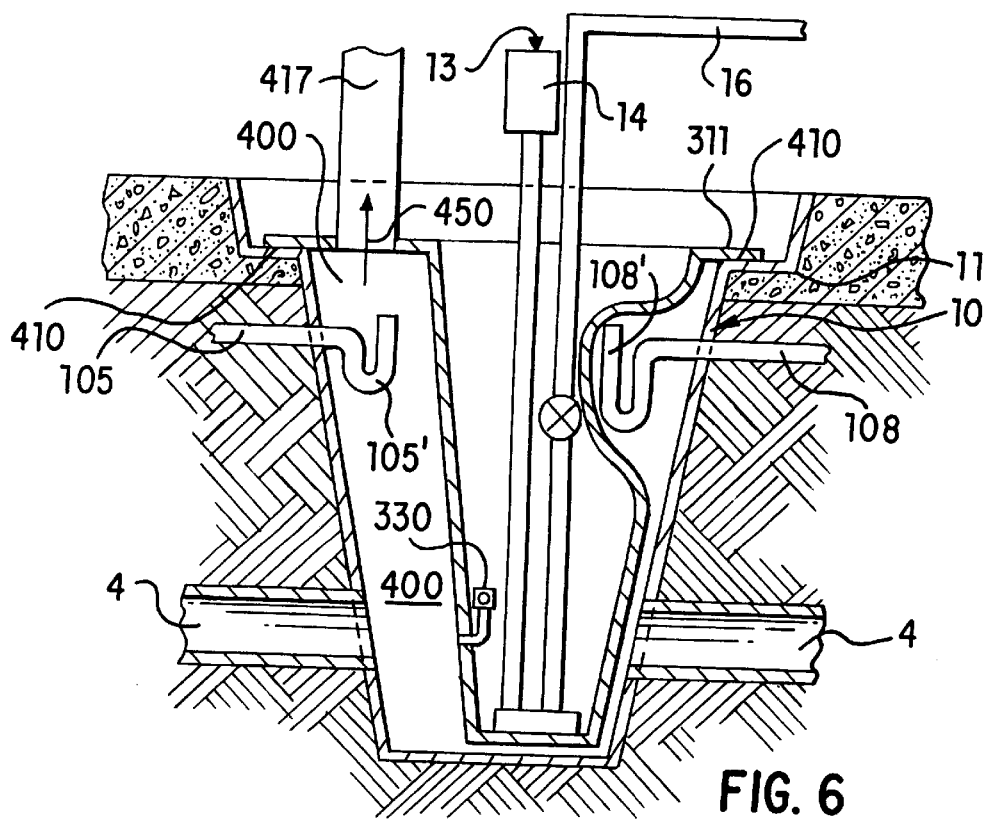

Turning now to FIG. 6, there is shown an alternate embodiment of the present invention. In this configuration, a sump hole crock liner member 300 is installed in retrofit manner within an existing drainage basin 10. Note that liner member 300 may be of different dimensional configuration and precise overall contour from that of the application shown in FIG. 5; however, its essential function and, therefore, its basic material and structural properties remain unchanged. The principles of overall system operation also remain unchanged from that illustrated in FIG. 5. The only significant differences are that, as with the prior art radon mitigation technique illustrated in FIG. 2, the above-ground drainage conduits 105, 108 which lead into basin 10 must be blocked off in substantially airtight manner. This may be accomplished, as shown, by use of water traps 105', 108', or by use of other suitable valving measures known in the art. While such valving measures typically protrude irregularly into the space within drainage basin 10, the flexibility of liner 300 enables it to substantially conform to and accommodate such protrusions without incurring detrimental effects on its essential function.

Note that both in this retrofit application, and in the application shown in FIG. 5, the cover member 12 is wholly free of the stringent structural and dimensional requirements placed on its formation of a cover member 12, as is a requirement in the prior art radon mitigation technique illustrated in FIG. 2. The liner 300 itself provides the sealing function served by the precisely-crafted cover member 112 in the prior art technique. The cover member employed in this application may simply be a crudely crafted cover typically employed in prior art drainage systems such as shown in FIG. 1.

Note also that since no portion of the sump pump assembly 13 need be disposed within the sealed plenum chamber 400, it is not necessary that a sump pump assembly of the submersible type be employed, as it is in the prior art mitigation technique of FIG. 2. A user implementing the subject radon mitigation system's retrofit application of FIG. 6 may continue utilizing his or her existing pedestal type sump pump assembly 13, if he or she so desires. This would afford great savings in time and money.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular structural and material properties of particular elements may be altered, all without departing from the spirit or scope of the invention as defined in the appended claims.

What is claimed is:

1. A method mitigating the migration of radon into a building structure having an in-ground collection basin formed in the foundation thereof and ground moisture drain conduits leading into said collection basin comprising the steps of:

(a) establishing in said basin a shoulder portion;

(b) establishing a liner member formed substantially of a gas impermeable material, said liner member having a sub-basin portion extending longitudinally from a laterally extended rim portion, said sub-basin portion having a predetermined dimensional configuration;

(c) placing said liner member within said basin, said liner member rim portion engaging said basin shoulder portion;

(d) establishing a plenum chamber between said basin and said liner member by forming a substantially airtight seal at said engagement of said liner member rim portion and said basin shoulder portion, said plenum chamber receiving the discharge from said ground moisture drain conduit;

(e) establishing a gas exhaust conduit extending out of said building structure from said plenum chamber; and, (f) generating an exhaust airflow from said plenum chamber through said gas exhaust conduit, whereby radon entering said plenum chamber is expelled out of said building structure.

2. The method as recited in claim 1 wherein said step of generating an exhaust airflow includes the step of substantially evacuating said plenum chamber.

3. The method as recited in claim 2 wherein said gas impermeable material substantially forming said liner member is flexible.

4. The method as recited in claim 2 further comprising the step of establishing check valve means coupled to said liner member for irreversible passage therethrough of liquid from said plenum chamber into said liner member sub-basin portion.

5. The method as recited in claim 2 further comprising before the step of generating an exhaust airflow from said plenum chamber the step of establishing within said plenum chamber means for substantially blocking the passage of air into said plenum chamber through above-ground drain conduits of said building structure leading thereto.

6. The method as recited in claim 5 wherein said means for substantially blocking the passage of air into said plenum chamber includes a water trap structure coupled to each one of said above-ground drain conduits of said building structure leading to said plenum chamber.

7. A radon mitigation system for mitigating the migration of radon into a building structure having an in-ground collection basin formed in the foundation thereof and a ground moisture drainage conduit leading into said collection basin comprising:

(a) a liner member formed substantially of a gas impermeable material disposed within said basin, said liner member having a longitudinally-extending sub-basin portion and a rim portion extending substantially radially outward therefrom, said rim portion contiguously engaging said basin to define a plenum chamber between said liner member and said basin, said sub-basin portion having a predetermined dimensional configuration;

(b) means for sealing said engagement of said liner member rim portion and said basin in substantially airtight manner;

(c) a gas exhaust conduit coupled to said liner member and leading out of said building structure for the expulsion therethrough of gas from said plenum chamber; and, (d) means operably coupled to said gas exhaust conduit for generating an exhaust airflow through said gas exhaust conduit from said plenum chamber, whereby radon entering said plenum chamber is expelled out of said building structure.

8. The radon mitigation system as recited in claim 7 further comprising valve means coupled to said liner member for irreversible passage of liquid from said plenum chamber into said liner member sub-basin portion.

9. The radon mitigation system as recited in claim 7 wherein said means for generating an exhaust airflow includes pump means for substantially evacuating said plenum chamber.

10. The radon mitigation system as recited in claim 7 wherein said gas impermeable material of said liner member is flexible.

11. The radon mitigation system as recited in claim 10 wherein said liner member is integrally molded from a plastic composition.

12. The radon mitigation system as recited in claim 7 further comprising means disposed within said plenum chamber for substantially blocking the passage of air into said plenum chamber through above-ground drain conduits of said building structure leading thereto.

13. The radon mitigation system as recited in claim 12 wherein said means for substantially blocking the passage of air into said plenum chamber includes a water trap structure coupled to each one of said above-ground drain conduits of said building structure leading to said plenum chamber.

14. A radon mitigation system for mitigating the migration of radon into a building structure comprising:

(a) a basin member extending through the foundation of said building structure, said basin member having an upper basin portion connected to a lower basin portion by a shoulder portion, said upper basin portion extending sufficiently through said foundation to receive the conduits of said building structure leading from said above-ground drains thereof, said lower basin portion receiving the ground moisture drain conduits of said building structure;

(b) a liner member formed substantially of a gas impermeable material disposed within said basin member, said liner member having a longitudinally-extending sub-basin portion and a rim portion extending substantially radially outward therefrom, said rim portion contiguously engaging said shoulder portion of said basin member to define a plenum chamber between said liner member and said lower basin portion of said basin member, said sub-basin portion being adapted to receive therein at least a portion of a predetermined sump pump assembly;

(c) means for sealing said engagement of said liner member rim portion and said basin member shoulder portion in substantially airtight manner; and, (d) means coupled to said liner member for guiding and expelling gas from said plenum chamber and out of said building structure.

15. The radon mitigation system as recited in claim 14 further comprising valve means coupled to said liner member for irreversible flow of liquid from said plenum member into said liner member sub-basin portion.

16. The radon mitigation system as recited in claim 15 wherein said valve means includes a check valve.

17. The radon mitigation system as recited in claim 15 wherein said valve means includes a water trap structure.

18. The radon mitigation system as recited in claim 14 wherein said means for guiding and expelling gas from said plenum chamber includes:

(a) a gas exhaust conduit coupled to said liner member and leading out of said building structure for the expulsion therethrough of gas from said plenum chamber;

(b) means operably coupled to said gas exhaust conduit for generating an exhaust airflow through said gas exhaust conduit from said plenum chamber.

19. The radon mitigation system as recited in claim 18 wherein said means for generating an exhaust airflow includes pump means for substantially evacuating said plenum chamber.

20. The radon mitigation system as recited in claim 14 wherein said liner member is integrally molded from a plastic composition.

* * * * *